(12) United States Patent
Archdekin et al.

(10) Patent No.: US 7,084,587 B2
(45) Date of Patent: Aug. 1, 2006

(54) APPARATUS AND METHOD FOR CONTROL OF HIGH INTENSITY DISCHARGE LIGHTING

(76) Inventors: James M. Archdekin, 76 Mercantile Way, Ladera Ranch, CA (US) 92694; Robin Charles Benas, 3456 Corte Selva, Carlsbad, CA (US) 92009

( * ) Notice: Subject to any disclaimer, the term of this patent is extended or adjusted under 35 U.S.C. 154(b) by 0 days.

(21) Appl. No.: 11/213,389

(22) Filed: Aug. 26, 2005

(65) Prior Publication Data

US 2006/0055248 A1    Mar. 16, 2006

Related U.S. Application Data

(60) Provisional application No. 60/606,972, filed on Sep. 2, 2004.

(51) Int. Cl.
G05F 1/00 (2006.01)
H05B 37/02 (2006.01)
H05B 39/04 (2006.01)
H05B 41/36 (2006.01)

(52) U.S. Cl. ..................................... 315/309
(58) Field of Classification Search ............... 315/291, 315/307–309
See application file for complete search history.

(56) References Cited

U.S. PATENT DOCUMENTS

| | | | | |
|---|---|---|---|---|
| 4,392,081 A | * | 7/1983 | Brown et al. ................ | 315/46 |
| 4,808,946 A | * | 2/1989 | Carver et al. ............... | 330/297 |
| 5,049,790 A | * | 9/1991 | Herfurth et al. ............ | 315/291 |
| 5,065,072 A | * | 11/1991 | Albou et al. ................ | 315/82 |
| 5,138,234 A | * | 8/1992 | Moisin ..................... | 315/209 R |
| 5,309,062 A | * | 5/1994 | Perkins et al. .............. | 315/53 |
| 5,483,127 A | * | 1/1996 | Widmayer et al. ......... | 315/307 |
| 5,508,589 A | * | 4/1996 | Archdekin .................. | 315/149 |
| 5,510,681 A | * | 4/1996 | Nilssen ..................... | 315/219 |
| 5,723,951 A | * | 3/1998 | Byszewski et al. ......... | 315/174 |
| 5,804,924 A | * | 9/1998 | Ohnishi et al. ............. | 315/160 |
| 6,400,579 B1 | * | 6/2002 | Cuk ........................ | 363/16 |
| 7,019,468 B1 | * | 3/2006 | Deurloo et al. ............ | 315/291 |

* cited by examiner

Primary Examiner—Thuy V. Tran
Assistant Examiner—Leith A. Al-Nazer
(74) Attorney, Agent, or Firm—Terry L. Miller

(57) ABSTRACT

An improved apparatus and method for control of discharge lighting, such as HID (high intensity discharge) lighting, effects full-voltage start up of the lighting, and sustained operation of the lighting at a reduced voltage after a selected and variable start-up phase or interval. The apparatus includes an auto transformer having a primary winding and a secondary winding. The primary winding is always in series with the load, but may be shorted to connect full line voltage from the line to the load. When the primary winding is not shorted, the secondary winding is connected to the load also, so that reduced voltage is provided to the load. A thermal analog device simulates the warm up time constant of the HID lighting unit, so that the reduction in operating voltage to the HID lighting unit is effected only after this lighting unit has achieved a sufficiently high temperature to sustain operation at a reduced operating voltage.

21 Claims, 7 Drawing Sheets

APPARATUS AND METHOD FOR CONTROL OF HIGH INTENSITY DISCHARGE LIGHTING

CROSS REFERENCE TO RELATED APPLICATION

This application is related to, and claims benefit of and priority under 35 USC § 119(c) from U.S. provisional application No. 60/606,972, filed 02 Sep. 2004.

BACKGROUND OF THE INVENTION

1. Field of the Invention

The present invention is in the field of lighting control. More particularly, the present invention pertains to apparatus and methods for controlling the voltage applied to a lighting unit, such as a HID (high intensity discharge) lamp. Such HID lighting advantageously provides a high light output per watt of energy consumed. Further, once started at full voltage, such HID lighting may sustain operation at a substantially reduced voltage with little or no reduction of light output, but with a substantially reduced energy consumption.

2. Related Technology

The present invention constitutes an improvement over prior art U.S. Pat. No. 4,431,948, issued Feb. 14, 1984, and also over U.S. Pat. Nos. 5,528,110; 5,508,589; and 5,623,186, the disclosures of which are incorporated herein by reference to the extent necessary for a full disclosure and understanding of the present invention.

The '948 patent discloses a controller for HID lighting effecting a selective reduction of applied voltage by use of an autotransformer connected in series with a switch. A first portion of the autotransformer winding is interposed between the input and the output, and an additional winding portion is interposed between the output and the common or neutral terminal of an alternating current power source. The first portion of winding is referred to the series winding of the autotransformer, and the second portion of the winding is referred to as the common winding of the autotransformer. The switch (which may be implemented as a relay, for example), is connected in series with the common winding so that when the relay is in its open condition, no current flows in the common winding, and the output voltage is substantially equivalent to the input voltage.

On the other hand, according to the '948 patent, when the switch contacts of the relay are closed current is permitted to flow in the common winding and the autotransformer performs its normal function with the output voltage reduced relative to the input voltage. However, the invention of the '948 patent has significant deficiencies, as is pointed out in the three later patents identified above.

In the three later patents identified above, an inventive autotransformer is provided with a bucking coil in order to cancel the creation of harmonics and inadvertent heating affects in the autotransformer. This inventive autotransformer avoids the deficiencies of the '948 patent. However, further improvements to the technology for controlling HID lighting are possible. There is, therefore, a need to provide an improved apparatus and method for control of HID lighting in order to achieve lowered power consumption.

SUMMARY OF THE INVENTION

In view of the deficiencies of the related technology, it is an object for this invention to reduce or eliminate at least one of these deficiencies.

Particularly, it is an object of this invention to provide an HID lighting controller with an improved autotransformer circuit which allows for starting the light unit at full voltage, and for reduction of the applied voltage during sustained operation of the light unit, using only a single SPDT switch, and with no interruption of current flow to the light unit during the change from full to reduced voltage.

A further object of this invention is to provide an HID lighting controller which utilizes a thermal inertia analog of the HID light in order to determine an adequate starting and warm up time interval for the HID light unit, which time interval will vary dependent upon ambient conditions.

Further to the above, the warm up time interval for the HID light unit may vary dependent upon ambient temperature; and to a lesser extent, dependent upon wind speed.

It is a further object that this invention provide a HID lighting controller which reduces the operating voltage to a HID light unit only after the HID light unit has achieved a sufficient operating temperature to sustain operation at the reduced voltage level.

These and other objects and advantages of the present invention will be more fully understood from a consideration of the following disclosure of particularly preferred exemplary embodiments of the invention, taken in conjunction with the appended drawing Figures.

BRIEF DESCRIPTION OF THE DRAWINGS

FIG. 4 provides a simplified partial circuit schematic of the lighting controller apparatus seen in FIG. 1;

FIG. 5 is a diagrammatic representation of a thermal inertia analog of an HID light seen in FIG. 1, and which is included in the controller of FIG. 1;

FIG. 7 provides a perspective view of another embodiment of HID lighting, and of another alternative embodiment of a controller for such lighting;

DETAILED DESCRIPTION OF PREFERRED EXEMPLARY EMBODIMENTS

Figure 1:
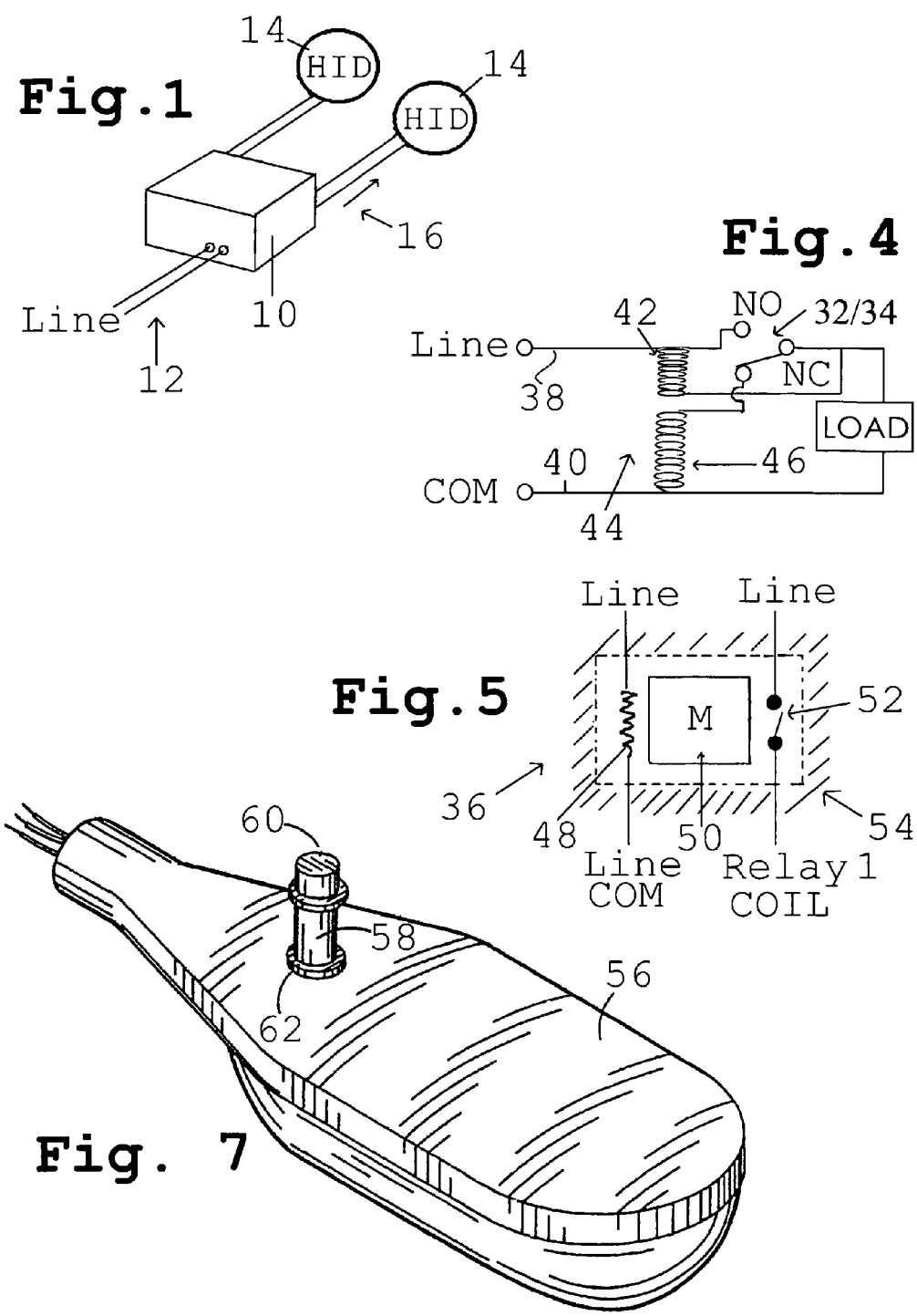
FIG. 1 diagrammatically illustrates one embodiment of an improved lighting controller apparatus for HID lighting.

Referring to FIG. 1, a lighting controller 10 receives line power via electrical wires 12, and controls a pair of HID lights 14, by means of interconnecting wiring generally indicated with the arrowed numeral 16. Viewing now FIGS. 2 and 3 in conjunction with one another, it is seen that the lighting controller 10 includes a generally rectangular box or case, 18 defining an interior cavity 20. Disposed within the cavity 20 is a printed circuit board 22, which is supported by means of standoffs 24. A connector strip 26 is carried adjacent to one edge of the printed circuit board 22 in order to facilitate connection of electrical wiring to the apparatus 10. This connector strip 26 also provides for connection of the circuitry (to be further explained below) which is disposed on the printed circuit board 22.

Figure 2:
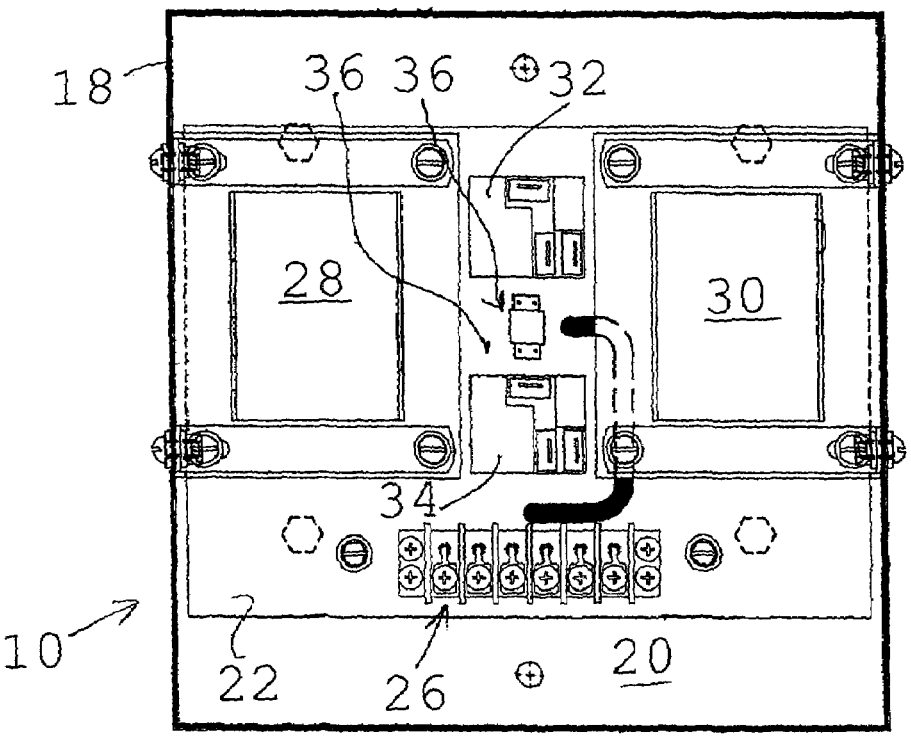
FIGS. 2 and 3, respectively, are partially cross sectional plan and elevation views of the lighting controller apparatus seen in FIG. 1.
Figure 3:
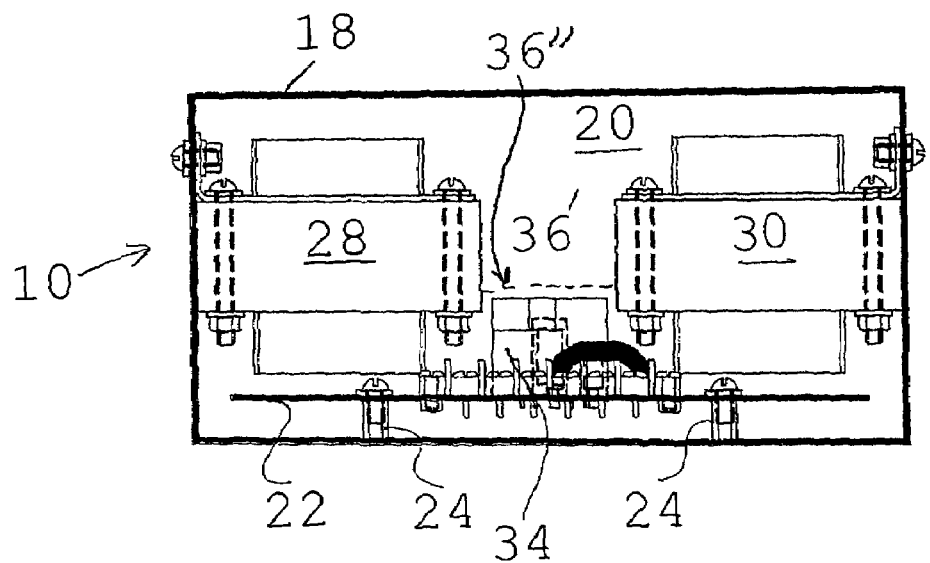

Viewing FIGS. 2 and 3 in greater detail, it is seen that the printed circuit board 22 carries a spaced apart pair of transformers 28 and 30. The dual transformers 28 and 30 allow the lighting control unit 10 to control a pair of HID light units (or two banks of such light units). Between this pair of transformers, the printed circuit board 22 carries a spaced apart pair of SPDT (single pole, double throw) relays 32 and 34. And, between the relays 32 and 34 (as well as between the transformers 28, 30), the printed circuit board 22 carries a thermal analog device, generally indicated with the arrowed numeral 36. It will be appreciated that the device 36 is located in a sheltered "pocket" or recess 36' formed next to the printed circuit board 22, and among the surrounding transformers and relays.

Not shown in FIGS. 2 and 3 for clarity of illustration, but existing in the apparatus 10, is a quantity of thermal insulation surrounding the thermal analog device 36 in recess 36'; and an environmental cover which spans the space between the pair of transformers 28, 30, and over the pair of relays 32, 34. That is, the environmental cover (indicated in FIG. 3 by the dashed line 36") spans across recess 36' just above the device 36, and forms an upper boundary wall above the device 36' in the same way the printed circuit board 22 forms a lower wall to the recess 36'. The space around the thermal analog device 36, and between the PC board 22 and environmental cover 36" is filled with a selected amount of thermal insulation, such as with fiberglass insulation. The thermal insulation and environmental cover about device 36 are further depicted and described below, but it is sufficient for now to understand that their purpose is to provide a protected and thermally controlled environment about the thermal analog device 36.

In order to proved an initial understanding of the operation of the lighting controller 10, attention now is directed to FIG. 4, which provides a simplified schematic of a portion of the controller 10. Viewing FIG. 4, it is seen that AC line power is received via wires 38, 40; and wire 38 is connected to one side of the primary winding 42 of a transformer 44 (representative of either transformer 28 or 30). The other side of this transformer winding 42 is connected to an HID lighting unit 14, and the other connection of the HID lighting unit 14 is connected to the other wire 40. So, whenever line voltage is applied to the wires 38 and 40, the HID lighting unit 14 will receive voltage. However, the voltage level received by the HID lighting unit 14 is controlled by the operation of the lighting control unit 10, and particularly is controlled by the operation of transformer 28 or 30 (represented by schematic transformer 44 in FIG. 4).

It is seen that the circuit illustrated in FIG. 4 includes a SPDT switch (representative of relays 32, or 34, and so indicated on FIG. 4 as "32/34") having a common contact connecting to the other side of the winding 44, and to the lighting unit 14. This relay 32 or 34 includes a normally open (NO) contact which is connected to the wire 38 and the first end of primary winding 42. Similarly, the relay 32 or 34 includes a normally closed (NC) contact which is connected to one end of a secondary winding 46 of the transformer 44.

The other end of this secondary winding 46 is connected to the wire 40. So, those ordinarily skilled in the pertinent arts will recognize that when the relay 28 or 30 is not energized, and the NC contacts are closed, the transformer 44 functions as a conventional autotransformer, and delivers a reduced voltage to the lighting unit 14. Viewed differently, when the NC contacts of relay 28 or 30 are closed, the relay 28 or 30 provides power from wire 38 to the first end of winding 46. And, when the NO contacts of this relay 28 or 30 are closed, then the relay shorts the primary winding 42, but delivers full voltage from wire 38 to the lighting unit 14. When the NC contacts of the relay 28 or 30 are closed a reduced voltage level delivered to the lighting unit 14 will be a ratio of line voltage generally according to the turns ratio of winding 46 compared to the total turns of windings 42 and 46 together. And, importantly, because of the configuration of the circuit seen in FIG. 4, the transition from full voltage applied to lighting unit 14, to a reduced voltage applied to this lighting unit, occurs without an interruption of current flow to the lighting unit. Thus, there is no tendency for the HID lighting unit to be extinguished because of even a temporary interruption of current flow. Current flow is continuous during the voltage reduction desired after warm up of the HID lighting units 14.

Now, in order to provide for full voltage starting of the HID lighting unit 14, followed by a sufficient warm up interval of operation at full voltage in order to insure that the lighting unit can remain lighted when voltage level is reduced for sustained operation, a thermal analog device 36 is provided. Viewing diagrammatic FIG. 5, it is seen that this thermal analog device 36 includes a controlled heat source, indicated with the arrowed numeral 48. This heat controlled heat source is preferably implemented by use of a resistor connected to line voltage and to common (i.e., across wires 38 and 40) so that when voltage is first applied to these wires to start the HID lighting unit 14, the resistor 48 starts to produce heat. The device 36 further includes a thermal mass, indicated by the arrow 50 (providing a warm up time constant), and a temperature responsive switch, indicated with the numeral 52. While it will be noted in the presently preferred embodiment that the temperature responsive switch 52 is normally closed, the invention is not so limited. That is, the device 36 could employ a normally open temperature responsive switch, and then would reverse the connection of the NO and NC contacts of the relays 28 and 30.

Further considering the thermal analog device 36, it is seen that it includes a thermal insulation barrier 54 (indicated by dashed lines and hash marks on FIG. 5). This insulation barrier 54 is provided by the thermal insulation and environmental cover mentioned above with reference to FIGS. 2 and 3. In practice, this thermal insulation barrier is selected to provide a desired and sufficient degree of thermal insulation between the combination of heater 48, mass 50, and switch 52, and ambient; so that the device 36 will warm from ambient to and sufficiently above the activation temperature of switch 52 with a time constant that is an analog of, but is preferably somewhat slower than, the warm up time constant or characteristic of the HID lighting unit 14. The desired and intentional slowness of the time constant for warming up of the thermal analog device 36 can be employed, for example, to insure that the HID light unit reaches its operating temperature despite windy conditions (which carry heat away from the HID light unit) before voltage is reduced by the controller 10. Thus, continued operation of the HID light unit once operating voltage is reduced by the controller 10 is assured.

As a result, when the HID lighting unit 14 is started at full line voltage, and is thereafter provided with a period of operation at full line voltage during which the lighting unit warms from ambient temperature to achieve a temperature sufficient to sustain operation at a reduced voltage level, the thermal analog device 36 will likewise warm up from ambient temperature. The thermal analog device is used to determine when the lighting unit 14 is sufficiently hot to sustain operation at reduced voltage. To this end, it will be noted that when voltage is first applied to the lighting controller 10, the switch 52 of the thermal device 36 is closed, and provides power to the coil of the relay 28 or 30. So, the NC contact of this relay 28 or 30 is opened, and the NO contact is closed. As a result, the coil 42 is shorted, and the HID lighting unit 14 immediately receives full line voltage (from wire 38, viewing FIG. 4), which is sufficient to start the HID lighting unit 14 even in cold ambient conditions.

Subsequently, the lighting unit 14 starts and warms up, and so does the thermal analog device 36 warm up. By the time the thermal analog device 36 achieves a temperature at which the temperature responsive switch 52 opens, the lighting unit 14 will have achieved a sufficient temperature to sustain operation at a reduced voltage level. As will be seen, this switch 52 is connected to the coil of relay 28 or 30, and when opened inactivates this relay in order to effect the desired voltage reduction for sustained operation of the HID lighting units 14.

Figure 6:
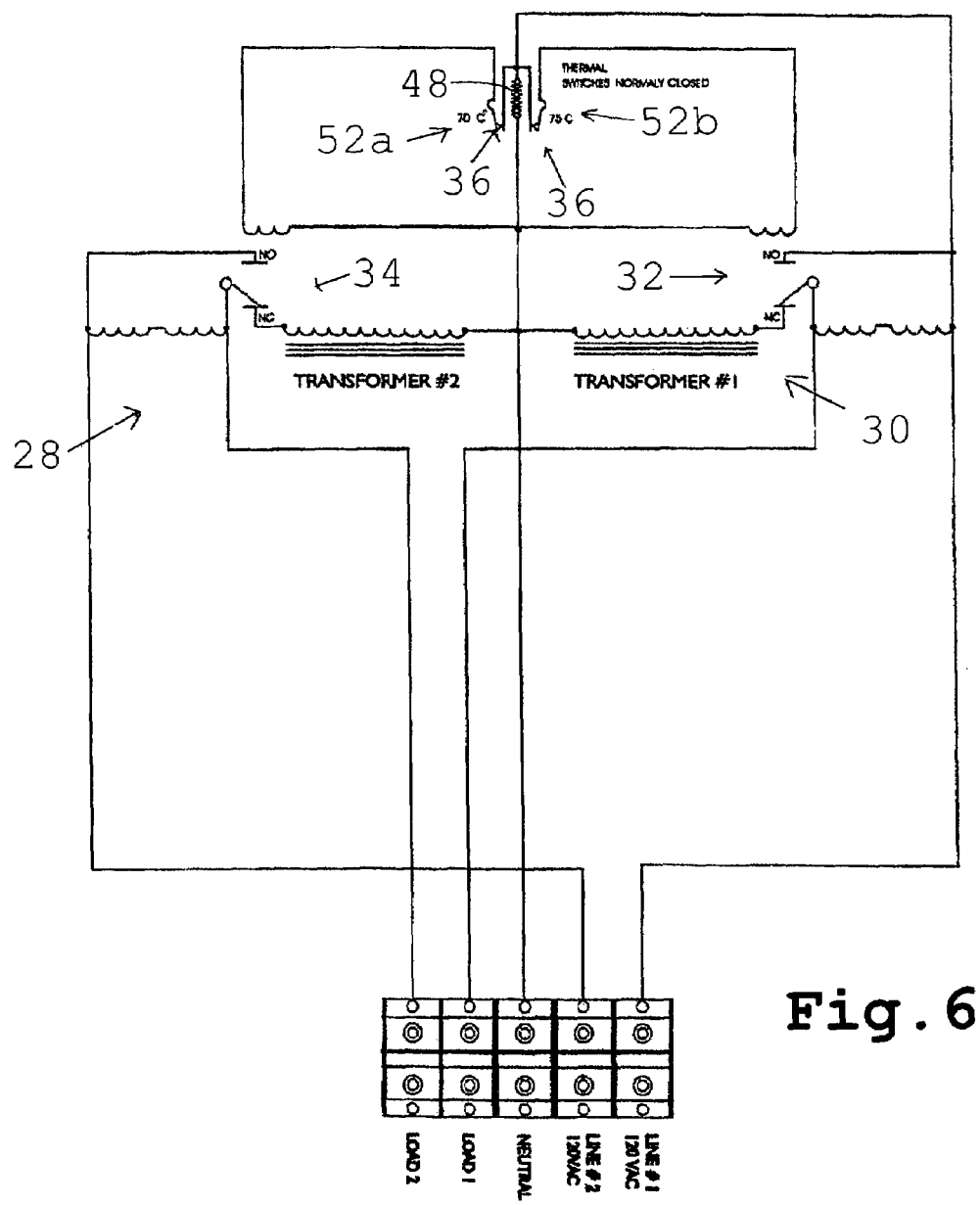
FIG. 6 is a complete circuit schematic for the lighting controller seen in FIGS. 1, 2, and 3.

Turning now to the schematic of FIG. 6, it is seen that the lighting control unit 10 actually contains a pair of transformers 28 and 30, and a pair of relays 32 and 34, all controlled by a pair of thermal analog devices (each indicated with the arrowed numeral 36), which are implemented using a single resistor as a heater for both thermal analog devices. That is, a single resistor 48 serves to provide heat to a pair of temperature responsive switches 52a and 52b. Further, the combined mass of the resistor 48 and switches 52a and 52b provides the desired thermal mass 50. As was pointed out above by reference to FIGS. 2, 3, and 5, thermal insulation placed into the recess 36', along with the environmental cover 36" over this recess, provides the desired insulation 54 from ambient. Those ordinarily skilled will realize that the insulation (or isolation) 54 of thermal analog device 36 from ambient is by no means complete, but is merely of a sufficient and desired level. That is, if the HID lamp units 14 are turned off after a period of operation, then the thermal analog device 36 will cool, as will the HID lighting units. By proper selection of the insulation value of the insulation 54, the device 36 will re-close the contacts of switch 52 after only a few minutes of non-operation of the lamps 14. Thus, once the switch 52 closes, the lamps may be restarted at full voltage by once again applying power to the lines 12 (i.e., to wires 38 and 40).

Figure 8:
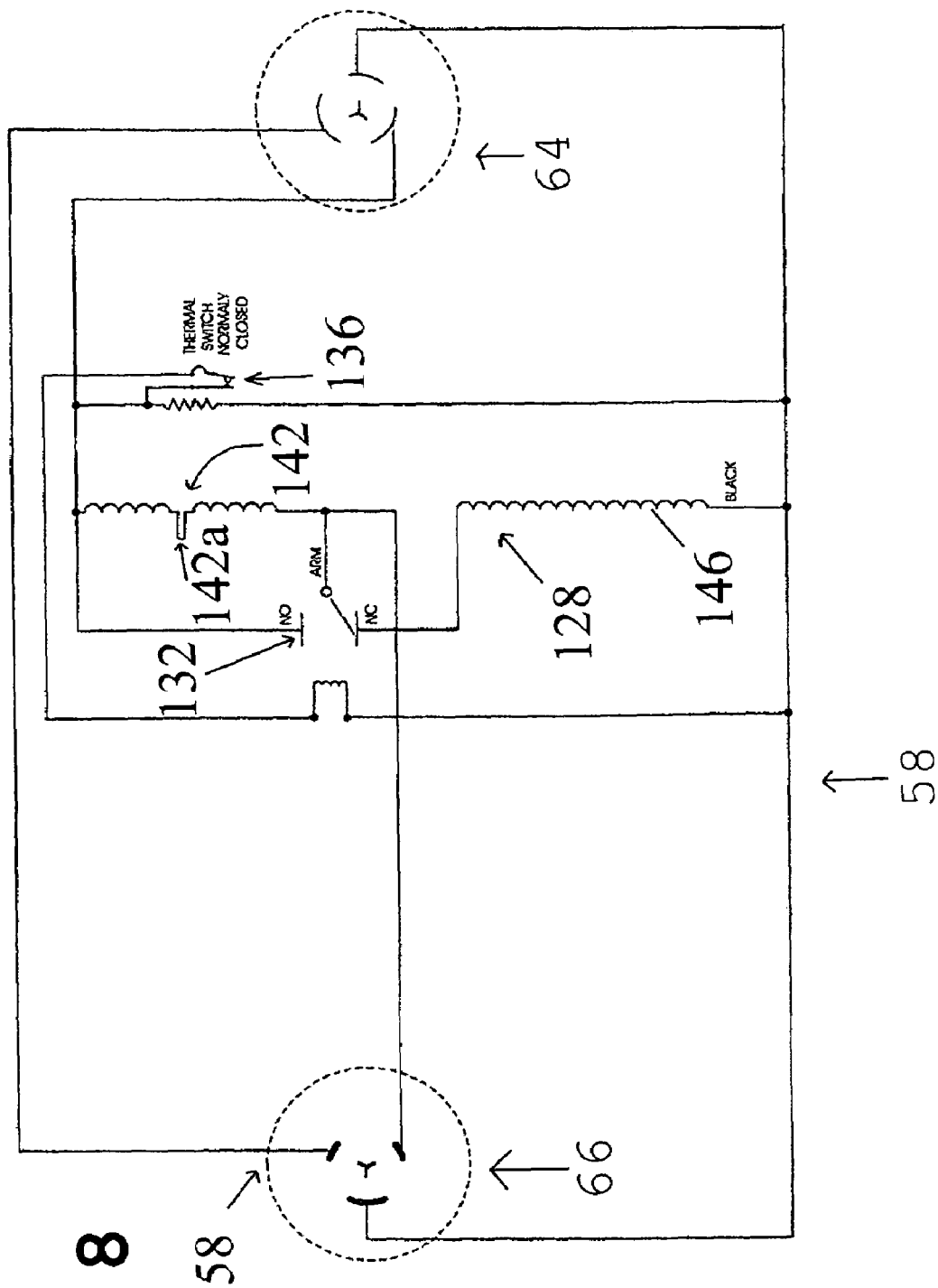
FIGS. 8 and 9 provide respective circuit schematics for the alternative embodiment of HID lighting controller seen in FIG. 7, which respectively provide a first level of reduced voltage for sustained operation of the HID lighting, or twice this first level of voltage reduction.

Turning now to FIG. 7 to see an alternative embodiment of the invention, it is seen that for a street lamp 56 (only the street lamp head being see in FIG. 7) the modular voltage reduction apparatus 58 of the present invention is configured to be interposed between the ambient light sensor 60 and the receptacle 62 of the lamp structure 56. More specifically, as seen in FIG. 8, the voltage reduction apparatus 58 provides a receptacle 64, which is a duplicate of the receptacle 62 of the lamp structure 56. In addition, the voltage reduction apparatus 58 provides a three pin plug 66 which provides the same pin arrangement as the ambient light sensor 60 so that it is compatible with the receptacle 62 of the lamp structure 56. Thus, it will be seen that installation of the embodiment of the present invention as seen in FIG. 7 is accomplished simply by way of temporarily removing the ambient light sensor 60 from the receptacle 62, installing the voltage reduction apparatus 58 into the receptacle 62, and then the ambient light sensor 60 is placed into the receptacle 64 of the voltage reduction apparatus 58. The ambient light sensor continues to carry out its function in an identical manner. However, the voltage applied to the high intensity discharge (HID) light unit of the street light 56, will be automatically reduced after initial discharge activation at full voltage.

Because many features of the embodiment of the invention shown in FIGS. 7, 8, and 9 are the same as, or are analogous to, those depicted and described above, features of FIGS. 7–9 which by now will be familiar to the reader are indicated with the same numeral used above and increased by one-hundred (100). Viewing FIG. 8, it is seen that the apparatus 58 includes a transformer, indicated with the arrowed numeral 128. In this case, the primary winding 142 of this transformer 128 includes a tap 142a, the use of which will be explained below with reference to FIG. 9. However, the transformer 128 also includes a secondary winding 146, and is associated with the power supply lines and with the load (i.e., street light 56) as the first embodiment explained above. Further, the embodiment of FIGS. 7–9 includes a SPDT relay 132, and a thermal analog device 136 as was explained above. Accordingly, the operation of the light control apparatus of FIGS. 7–9 is that same as that discussed above, and the street light 56 is started and warmed up at full voltage, after which the operating voltage to the HID light unit is reduced when the thermal analog device 136 indicates a sufficiently high temperature has been achieved to sustain operation of the street light at reduced voltage.

Figure 9:
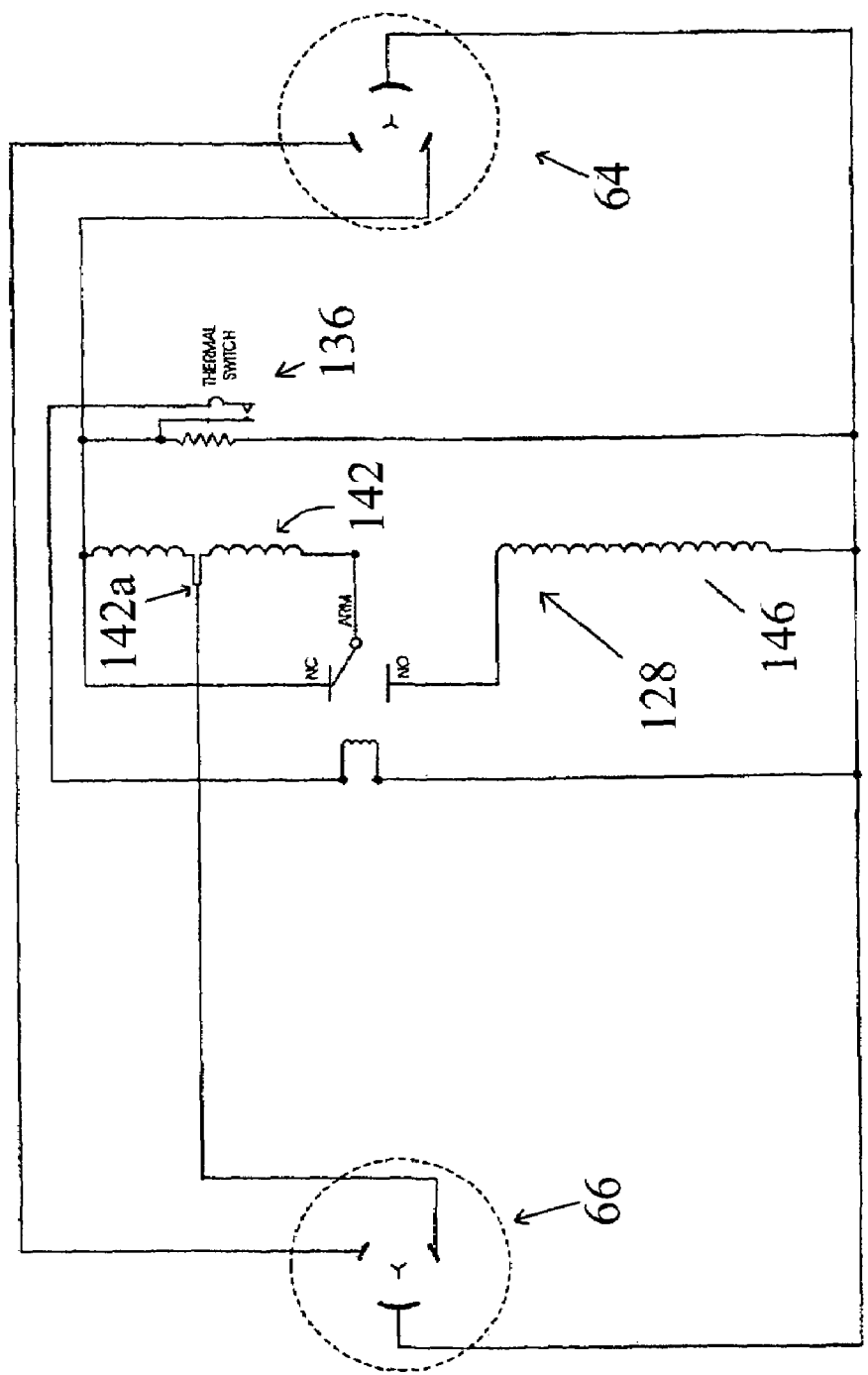

The circuit of FIG. 9 is essentially the same as that indicated on FIG. 8, with the exception that the connection from plug 66 to the primary winding 142 is made at the tap 142a, rather than at the end of this primary winding 142. The result is that when the operating voltage to the controlled street light is reduced from full voltage to some lower selected operating voltage, the voltage reduction effected by the embodiment of FIG. 9 is twice that effected by the embodiment of FIG. 8. It will be noted that the apparatus of FIGS. 8 and 9 are the same with the exception of the connection between transformer 142 and the plug 66. Accordingly, it is apparent that a user of the apparatus 58 of FIGS. 8 and 9 may select the voltage reduction desired for sustained operation of the street light 56. With the voltage reduction effected by the embodiment of FIG. 8, there may be no noticeable reduction of street illumination. On the other hand, if a small but noticeable reduction in street illumination is tolerable, then the embodiment of FIG. 9 may be utilized, in order to realize a reduction of about 36% or more in the cost of operating the street light 56.

Figure 10:
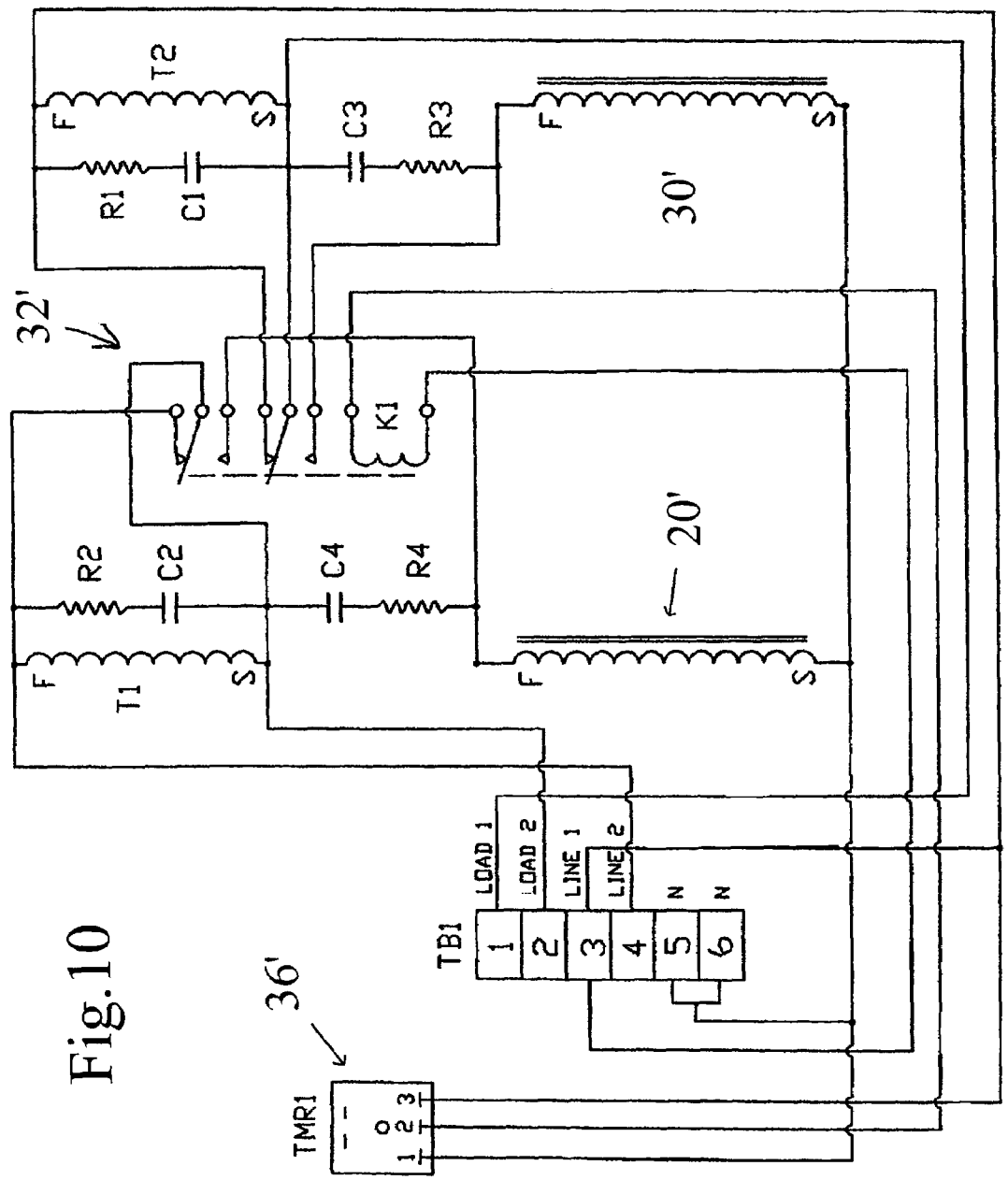
FIG. 10 is a complete circuit schematic for a lighting controller similar to that seen in FIG. 6, but including a count-down timer for effecting a change from start-up voltage to operating voltage for a pair of controlled discharge lighting units.

FIG. 10 illustrates an alternative embodiment of the present invention, similar in many respects to that of FIG. 6, but including a countdown timer for effecting a switch in the operating voltage of controlled discharge lighting from a start-up voltage to a lower operating voltage. Accordingly, because the embodiment of FIG. 10 has many features in common with FIG. 6, features of FIG. 10 with are the same as or analogous to those depicted and described above with reference to FIG. 6 are indicated on FIG. 10 with that same numeral used above but having a prime (') added thereto.

Viewing FIG. 10, it is seen that the lighting control unit 10' contains a pair of transformers 28' and 30' (the transformer secondary windings being indicated as T1 and T2), and a single double-pole, double-throw (DPDT) relay 32' which performs the function of the pair of relays 32, 34 seen in FIG. 6. The relay 32', is controlled by a single countdown timer 36', which has a pre-selected count-down interval, and upon activation begins counting down this interval toward zero (0). That is, the timer 36' starts its countdown when the controller 10' is energized so that full line voltage is applied to the lighting units connected to the "load" connections of the controller 10'. By proper selection of the count-down time interval implemented by the timer 36', HID lamps connected to the "load" terminals of the controller 10' will start reliably at full line voltage, and then will be switched to the lower desired operating voltage (i.e., by application of the inventive autotransformer circuit diagrammatically illustrated in FIG. 4) which is implemented by the circuitry of controller 10'. An advantage of the control circuit 10' particularly realized in locations experiencing extremely cold winter temperatures is that a thermal analog (i.e., as employed in the controller 10 of FIG. 6) is not a perfect analog of the HID lamps connected to the controller. In exceedingly cold climates, and particularly after a day-long cold soak period (as street lamps and sign illumination lamps experience) some difficulties with the lamps not reaching sustaining temperature for operation at the reduced voltage before the operating voltage is reduced may be experienced. In that case, the lamps would drop out of discharge operation when the voltage is reduced, and they would not re-start.

However, the embodiment of FIG. 10 avoids this difficulty by allowing a certain time interval to be selected which will insure that the HID lamps reach a sustaining temperature before the operating voltage is reduced, even after a prolonged cold soak in exceedingly low temperatures. Those ordinarily skilled in the pertinent arts will also appreciate that a combination of the embodiments of FIGS. 4 and 10 can be utilized and can be effected by the simple expedient of using a temperature responsive switch to select between a thermal analog start-up timer, or a count-down start-up timer. So, if this expedient is implemented, the HID lamps would start up in moderate conditions using a thermal analog, and energy would be saved by allowing the lamps to switch to a lower sustaining voltage as soon as is practicable. On the other hand, in extremes of cold temperatures, the HID lamps would start up using a count-down timer, and sustaining operation of the lamps when the voltage is reduced is assured, because the time interval is chosen such as to insure adequate lamp warm up and continued illumination of the lamps upon operating voltage reduction no matter how cold ambient temperatures may be.

Figure 11:
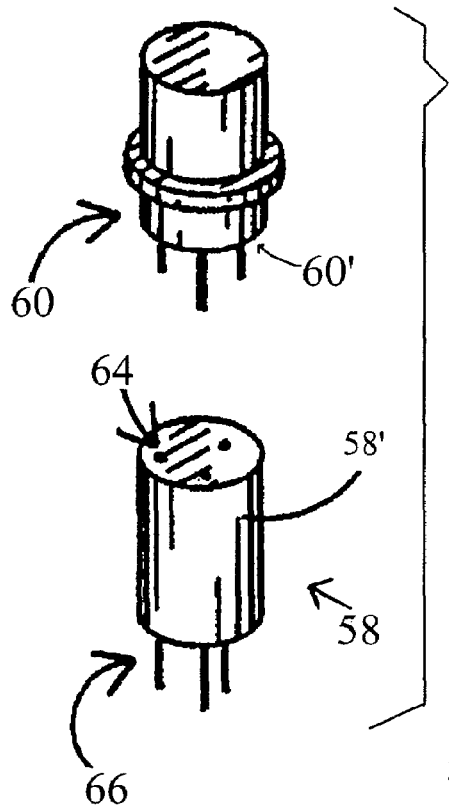
FIG. 11 is an exploded diagrammatic perspective view of a lighting controller for a street lamp and of an ambient light sensor for that street lamp which plugs into the lighting controller.
Figure 12:
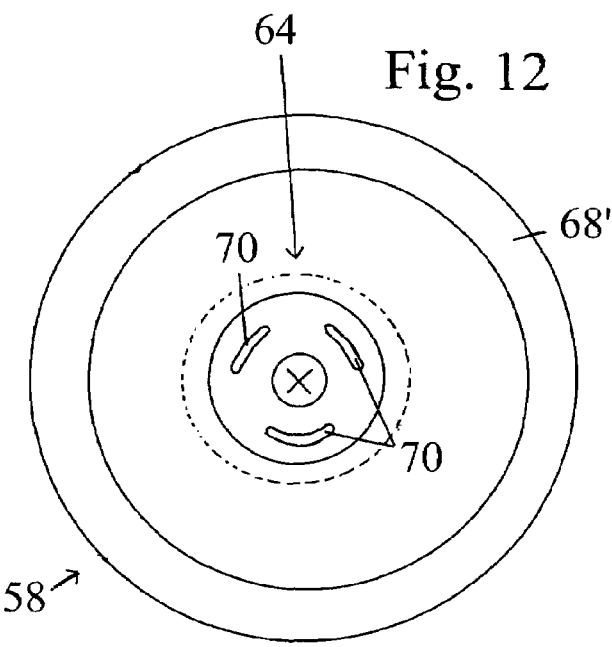
FIGS. 12 and 13, respectively, are a plan view and an elevation view (partially in cross section) of a street lamp lighting controller as is seen in FIGS. 7, 8, 9, and 11.
Figure 13:
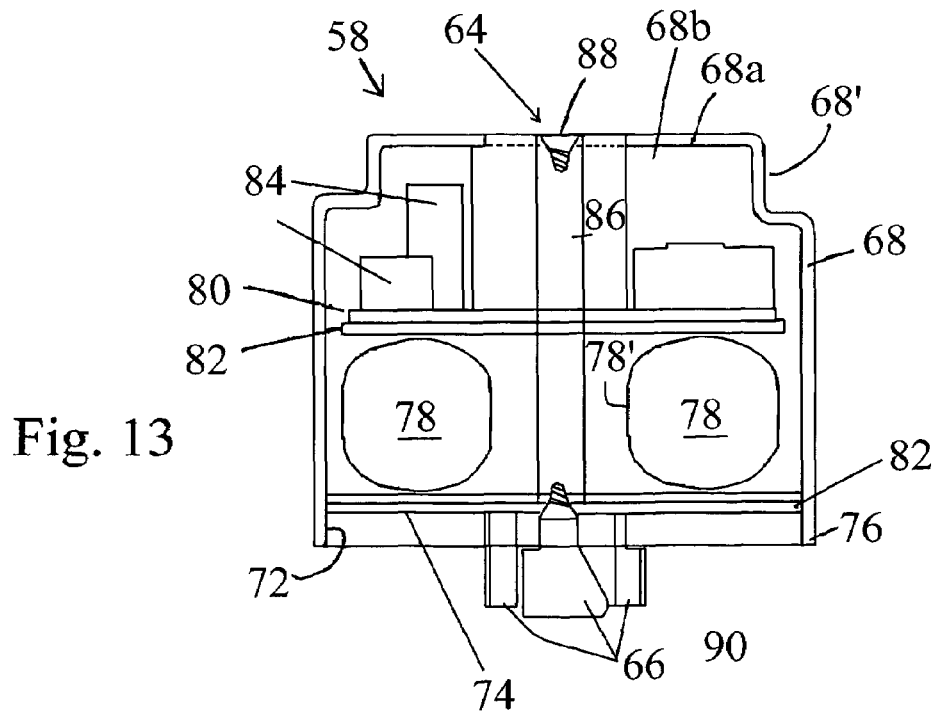

Returning again to a consideration of FIG. 7, and considering also FIGS. 11, 12, and 13, it will be recalled that for a street lamp 56 the modular voltage reduction apparatus 58 of the present invention is configured to be interposed between the ambient light sensor 60 and the receptacle 62 of the lamp structure 56 (recalling FIG. 7). More specifically, as seen in FIG. 11, the modular voltage controller or reduction apparatus 58 includes a housing 58' which provides an upwardly disposed receptacle 64 (which is a functional duplicate of the receptacle 62 of the street lamp structure 56). In addition, the voltage reduction apparatus 58 provides a three pin plug 66 (which provides the same pin arrangement as the ambient light sensor 60). As a result, the modular voltage reduction apparatus 58 is compatible with the receptacle 62 of the lamp structure 56 and with the ambient light sensor 60. The controller 58 is plugged into the receptacle 62 of the street lamp 56, and the ambient light sensor is plugged into the controller 58, as is indicated by the arrow on FIG. 11.

Turning to FIGS. 12 and 13, it is seen that in order for the housing 58' to provide adequate weather protection in the harsh environment encountered atop of a street lamp, the housing 58' includes a cup-shaped (i.e., an inverted cup-shaped) housing portion 68 defining an end wall 68a defining a central opening 68b through which the receptacle 64 is accessed. An annular recess 68' circumscribes the upper end of the housing portion 68, and provides for a weather skirt portion 60' (arrowed on FIG. 11) of the ambient light sensor 60 to pass partially downwardly a selected distance over the housing 58'. Further, this housing portion 68 defines a downwardly disposed opening 72, and receives a plate-like closure member 74 into the opening 72, which closure member is recessed upwardly a determined distance into the opening 72 to providing a depending skirt portion 76. In the same way that the skirt 60' passes into recess 68' and partially over the housing 68 in order to provide weather protection for the electrical connection of the ambient light sensor into the controller 58, the skirt 76 replicates skirt 60' and provides a similar weather protection when the controller 58 is plugged into the receptacle 62 of a street lamp, recalling FIG. 7.

Further considering FIG. 13, it is seen that a torroidal transformer 78 is received within the housing 68. This torroidal transformer serves the function of the transformer 128 schematically illustrated in FIGS. 8 and 9. A passage 78' is defied centrally of this transformer 78. Above the transformer 78, a printed circuit board 80 rests upon a resilient spacer and insulator 82, and carries circuit elements 84. Another resilient insulator 82 is also disposed below the transformer 78 so that the pair of resilient insulators 82 sandwich the transformer 78. Recalling the description of FIGS. 8 and 9, it will be seen that the circuit elements 84 can include such elements as the thermal analog device 136, and the relay 132. Alternatively, a countdown timer, recalling FIG. 10, may be included in the circuit elements 84. Extending centrally of the passage 78 and from the end wall 68a to the closure member 74 is a tie rod 86. This tie rod 86 is secured by a pair of screws 88, 90, which each threadably engage into respective axially extending holes defined by the rod 86, so that the closure member, as well as the circuit element contents of the controller 58, are retained in the housing 58' including cup-shaped housing portion 68. The tie rod 86 and screws 88 maintain the stack of components described immediately above in compression, while the pair of resilient insulators 82 provide for manufacturing variations in the axial dimension of the transformer 78 such that the distance between the closure member 74 and the upper face of receptacle 64 is fixed.

Again, it is most preferred that the housing portion 68 and closure member 74 be formed, possibly by molding, each in one integral piece of polymer material. The polymer material to be used for the housing portions 68 and 74 is well within the art of those ordinarily skilled in the pertinent arts to select, but it is to be both weather resistant and resistant to deterioration by ultraviolet light (i.e., by sunlight) in the harsh environment encountered atop of a street lamp. As explained above, the axial dimension of the contents of the housing 68 is fixed (i.e., by tie rod 86), and the closure member 74 is arranged for a snap fit with the cup-shaped member 68 such that the controller 58 is simply snapped together within housing portion 68, yet excellent weather protection is provided to the circuitry within the controller 58.

In view of the above, it is apparent that the present invention is not limited to the precise details of the preferred exemplary embodiments depicted, described, and disclosed above. Instead, this invention is intended to be limited only by the sprit and scope of the appended claims, giving full cognizance to equivalents.

The invention claimed is:

1. A control apparatus for starting a load device at full AC line voltage, and for sustained operation of said load device at a reduced operating voltage with no loss of continuity between the line and load during voltage reduction, said control apparatus comprising: an autotransformer having a primary winding including first and second ends, and a secondary winding having respective first and second ends; said primary winding being connected at its first end to one side of said AC line and at its second end being connected to one side of said load device;
   a SPDT switch having a first switch contact connecting to said first end of said primary winding, and a common contact connecting to said load device so that when said first switch contact and said common contact are connected, said primary winding is shorted and said load device receives full line voltage;
   said SPDT switch including a second switch contact connecting to a first end of said secondary winding, and a second end of said secondary winding connecting to the other side of said AC line and to the other side of said load device, so that when said second switch contact and said common contact are connected said primary and secondary windings are in series across said AC line and said load device receives reduced voltage.

2. The control apparatus of claim 1 further including an interval device for causing said SPDT switch to change from connection of said common contact with said first switch contact and to connection of said common contact to said second switch contact upon passage of a time interval after application of line voltage to said control apparatus and load.

3. The control apparatus of claim 2 wherein said interval device includes a thermal analog of said load device.

4. The control apparatus of claim 3 wherein said interval device effects a variable time interval between application of line voltage to said control apparatus and load and reduction of the voltage applied to said load dependent upon ambient temperature.

5. The control apparatus of claim 3 wherein said interval device includes a count down timer.

6. The control apparatus of claim 5 wherein said interval device effects a determined time interval between application of line voltage to said control apparatus and load and reduction of the voltage applied to said load dependent upon a value of said count down timer.

7. The control apparatus of claim 1 wherein said load device includes a high intensity discharge (HID) lamp.

8. The control apparatus of claim 1 further including a second autotransformer also having a primary winding including first and second ends, said second autotransformer also having a secondary winding having respective first and second ends; said primary winding being connected at its first end to one side of said AC line and at its second end being connected to one side of a second load device;
   a second SPDT switch having a first switch contact connecting to said first end of said primary winding of said second autotransformer, and a common contact connecting to said second load device so that when said first switch contact and said common contact are connected, said primary winding of said second autotransformer is shorted and said second load device receives full line voltage;
   said second SPDT switch including a second switch contact connecting to a first end of said secondary winding of said second autotransformer, and a second end of said secondary winding connecting to the other side of said AC line and to the other side of said second load device, so that when said second switch contact and said common contact of said second SPDT switch are connected said primary and secondary windings are in series across said AC line and said second load device receives reduced voltage.

9. A control apparatus for starting a load device at full AC line voltage, and for sustained operation of said load device at a reduced operating voltage with no loss of continuity between the line and load during voltage reduction, said control apparatus comprising: an autotransformer having a primary winding including first and second ends, and a secondary winding having respective first and second ends; said primary winding being connected at its first end to one side of said AC line and at its second end being connected to one side of said load device;
   a SPDT switch having a first switch contact connecting to said first end of said primary winding, and a common contact connecting to said load device so that when said first switch contact and said common contact are connected, said primary winding is shorted and said load device receives full line voltage;
   said SPDT switch including a second switch contact connecting to a first end of said secondary winding, and a second end of said secondary winding connecting to the other side of said AC line and to the other side of said load device, so that when said second switch contact and said common contact are connected said primary and secondary windings are in series across said AC line and said load device receives reduced voltage;
   further including a second autotransformer also having a primary winding including first and second ends, said second autotransformer also having a secondary winding having respective first and second ends; said primary winding being connected at its first end to one side of said AC line and at its second end being connected to one side of a second load device;
   a second SPDT switch having a first switch contact connecting to said first end of said primary winding of said second autotransformer, and a common contact connecting to said second load device so that when said first switch contact and said common contact are connected, said primary winding of said second autotransformer is shorted and said second load device receives full line voltage;
   said second SPDT switch including a second switch contact connecting to a first end of said secondary winding of said second autotransformer, and a second end of said secondary winding connecting to the other side of said AC line and to the other side of said second load device, so that when said second switch contact and said common contact of said second SPDT switch are connected said primary and secondary windings are in series across said AC line and said second load device receives reduced voltage;
   wherein said device includes a case receiving said autotransformer, said second autotransformer, said SPDT switch, and said second SPDT switch; said autotransformers being arrayed within said case in spaced apart relation, and said SPDT switches similarly being arrayed within said case in spaced apart relation along an orthogonal line to define a recess among said autotransformers transformers and SPDT switches; and disposed in said recess is a thermal analog device which substantially replicates a warm up time constant of said load device and of said second load device.

10. The control device of claim 9 further including a mass of thermal insulation received into said recess, and a protective cover member spanning said recess.

11. A lighting control apparatus for an HID lighting unit, said lighting control apparatus comprising:
an autotransformer having a primary winding including first and second ends, and a secondary winding having respective first and second ends; the primary winding being connected at its first end to a source of AC power, and at its second end with one side of the HID lighting unit;
a SPDT switch having a first switch contact connecting to said first end of said primary winding, and a common contact connecting to the one side of the HID lighting unit so that when said first switch contact and said common contact are connected, said primary winding is shorted and said HID lighting unit receives full line voltage;
said SPDT switch including a second switch contact connecting to a first end of said secondary winding, and a second end of said secondary winding connecting to said source of AC power and to the other side of said HID lighting unit, so that when said second switch contact and said common contact are connected, said primary and secondary windings are in series across said source of AC power and said HID lighting unit receives reduced voltage;
whereby, said lighting control unit provides said HID lighting unit with either full line voltage or with reduced line voltage, without. interruption of current flow to the HID lighting unit.

12. A lighting control unit for an HID lighting unit, said lighting control unit including a variable voltage supply able to operate the lighting unit either at full line voltage or at a reduced voltage, and a thermal analog device simulating the warm up time constant of the HID lighting unit so that the lighting unit is started and warmed up at full line voltage, and the operating voltage to the lighting unit is reduced only after the lighting unit is sufficiently warm to sustain operation at the reduced voltage.

13. A method of effecting start up of an HID lamp at full line voltage, and of reducing the operating voltage of the HID lamp for sustained operation at reduced energy consumption with no interruption of continuity between the line and the HID lamp, said method comprising steps of:
providing an autotransformer having a primary winding including first and second ends, and a secondary winding having respective first and second ends;
connecting said primary winding at its first end to one side of said line, and connecting said primary winding at its second end in series with said HID lighting unit;
providing a SPDT switch having a first switch contact, and connecting said first switch contact to said first end of said primary winding, and connecting the common contact of said SPDT switch to said HID lighting unit so that when said first switch contact and said common contact are connected said primary winding is shorted and said HID lighting unit receives full line voltage;
connecting a second switch contact of said SPDT switch to a first end of said secondary winding, and a second end of said secondary winding connecting to the other side of said line and to the other side of said HID lamp, so that when said second switch contact and said common contact are connected, said primary and secondary windings are in series across said line and said HID lighting unit receives reduced voltage.

14. The method of claim 13 further including the steps of providing a thermal analog device, and applying power simultaneously to said HID lamp and to said thermal analog device so that said thermal analog device warms up from ambient temperature in approximate analogy to the warming of said HID lamp from ambient temperature, and employing a temperature level of said thermal analog device to effect switching of said SPDT switch to reduce operating voltage applied to said HID lamp, so that when operating voltage to said HID lamp is reduced it will have achieved a sufficiently high temperature above ambient to sustain discharge operation at reduced operating voltage.

15. The method of claim 13 further including the steps of providing a count down timer which counts down a determined time interval upon power being applied to said timer and then effects switching of said SPDT switch to reduce operating voltage provided to said HID lamp, and applying power simultaneously to said HID lamp and to said count down timer so that when said count down timer reaches the end of said determined time interval and effects switching of said SPDT switch to reduce operating voltage applied to said HID lamp said HID lamp will have achieved a sufficiently high temperature above ambient to sustain discharge operation at reduced operating voltage.

16. A plug-in modular control unit for an HID street lamp, said control unit comprising:
an autotransformer having a primary winding including first and second ends, and a secondary winding having respective first and second ends; the primary winding being connected at its first end to a source of AC power, and at its second end with one side of the HID street lamp;
a SPDT switch having a first switch contact connecting to said first end of said primary winding, and a common contact connecting to the one side of the HID street lamp so that when said first switch contact and said common contact are connected, said primary winding is shorted and said HID street lamp receives full line voltage;
said SPDT switch including a second switch contact connecting to a first end of said secondary winding, and a second end of said secondary winding connecting to said source of AC power and to the other side of said HID street lamp, so that when said second switch contact and said common contact are connected, said primary and secondary windings are in series across said source of AC power and said HID street lamp receives reduced voltage without interruption of current flow to the HID street lamp.

17. The plug-in modular control unit of claim 16 further including an elongate housing presenting a male plug at one end and a complementary female receptacle at an opposite end, said male plug being configured to insert into a light sensor receptacle of said street lamp, and said complementary receptacle receiving a light sensor for control of said street lamp.

18. The plug-in modular control unit of claim 17 wherein said autotransformer is of toroidal configuration to fit within said elongate housing between said male plug and said female receptacle.

19. The plug-in modular control unit of claim 18 wherein said toroidal autotransformer provides a central opening through which a structural element of said control unit housing is received.

20. The plug-in modular control unit of claim 19 wherein said housing includes an inverted cup-shaped housing portion upwardly defining openings for a female receptacle, and downwardly defining an opening into which is received a closure member carrying male prongs of an electrical plug complementary to said female receptacle.

21. For use in combination with a street lamp having a lamp structure with a receptacle receiving an ambient light sensor for automatically activating the street lamp upon a reduction in ambient light, a modular voltage reduction apparatus configured to be interposed between the light sensor and the lamp structure, and said modular voltage reduction apparatus comprising: a receptacle for receiving said light sensor; a plug for mating said modular voltage reduction apparatus to said lamp structure receptacle; and a voltage control circuit for starting said street lamp at full line voltage, and for sustaining operation of the street lamp at reduced voltage without interruption of current flow to said lamp structure;

wherein said voltage control circuit including an autotransformer having a primary winding including first and second ends, and a secondary winding having respective first and second ends; said primary winding being connected at its first end to one side of said AC line and at its second end being connected to one side of said load device; a SPDT switch having a first switch contact connecting to said first end of said primary winding, and a common contact connecting to said load device so that when said first switch contact and said common contact are connected, said primary winding is shorted and said load device receives full line voltage; said SPDT switch including a second switch contact connecting to a first end of said secondary winding, and a second end of said secondary winding connecting to the other side of said AC line and to the other side of said load device, so that when said second switch contact and said common contact are connected said primary and secondary windings are in series across said AC line and said load device receives reduced voltage.

* * * * *